United States Patent
Röppänen

(10) Patent No.: US 10,502,410 B2
(45) Date of Patent: Dec. 10, 2019

(54) ARRANGEMENT OF HEAT RECOVERY SURFACES OF A RECOVERY BOILER

(71) Applicant: ANDRITZ OY, Helsinki (FI)

(72) Inventor: Jukka Röppänen, Helsinki (FI)

(73) Assignee: Andritz Oy, Helsinki (FI)

(*) Notice: Subject to any disclaimer, the term of this patent is extended or adjusted under 35 U.S.C. 154(b) by 0 days.

(21) Appl. No.: 16/071,753

(22) PCT Filed: Jan. 25, 2017

(86) PCT No.: PCT/FI2017/050039
§ 371 (c)(1),
(2) Date: Jul. 20, 2018

(87) PCT Pub. No.: WO2017/129861
PCT Pub. Date: Aug. 3, 2017

(65) Prior Publication Data
US 2019/0078773 A1    Mar. 14, 2019

(30) Foreign Application Priority Data

Jan. 28, 2016 (FI) .................................. 20165056

(51) Int. Cl.
*F22B 21/00* (2006.01)
*F22G 7/14* (2006.01)
(Continued)

(52) U.S. Cl.
CPC ............ *F22B 21/002* (2013.01); *D21C 11/06* (2013.01); *F22B 21/00* (2013.01); *F22B 31/045* (2013.01);
(Continued)

(58) Field of Classification Search
CPC ........ F22B 31/045; F22B 21/002; F22G 7/14; F23G 7/04; D21C 11/12
(Continued)

(56) References Cited

U.S. PATENT DOCUMENTS 3,324,837 A    6/1967 Gorzegno et al.
4,342,286 A *  8/1982 Pollock ..................... F22D 1/06
                                              122/238
(Continued)

FOREIGN PATENT DOCUMENTS

CN    103206699    7/2013
CZ    304994       3/2015
(Continued)

OTHER PUBLICATIONS

International Search Report for PCT/FI2017/050039, dated Jun. 9, 2017, 5 pages.
(Continued)

*Primary Examiner* — Tom P Duong
(74) *Attorney, Agent, or Firm* — Nixon & Vanderhye P.C.

(57) ABSTRACT

An arrangement in a recovery boiler having a furnace for combusting waste liquor and a flue gas duct including vertical flue gas channels, at least some of which are provided with heat recovery units for recovering heat from flue gases. The first flue gas channel downstream of the furnace is provided with a reheater and one of the following heat recovery units: an economizer or a boiler bank. The reheater and the second heat recovery unit are located one after the other in the horizontal incoming direction of the flue gas, so that in a flue gas channel the flue gas flows in a vertical direction from above downwards and heats the reheater and the second heat recovery unit simultaneously. The heat recovery elements of the reheater and the second heat recovery unit may be positioned side by side in a direction that is crosswise with respect to the horizontal incoming direction of the flue gas.

26 Claims, 5 Drawing Sheets

(51) Int. Cl.
*D21C 11/06* (2006.01)
*F22B 31/04* (2006.01)
*F23G 7/04* (2006.01)
*D21C 11/12* (2006.01)

(52) U.S. Cl.
CPC ............... *F22G 7/14* (2013.01); *F23G 7/04* (2013.01); *D21C 11/12* (2013.01)

(58) Field of Classification Search
USPC .............. 122/477, 460, 294, 258, 255, 238
See application file for complete search history.

(56) References Cited

U.S. PATENT DOCUMENTS

| | | | | |
|---|---|---|---|---|
| 4,430,962 | A | * | 2/1984 | Miszak ............... F22B 29/12 122/406.4 |
| 5,299,534 | A | | 4/1994 | Janka |
| 5,950,574 | A | | 9/1999 | Matsuda et al. |
| 7,640,750 | B2 | | 1/2010 | Saviharju et al. |
| 8,443,606 | B2 | | 5/2013 | Monacelli et al. |
| 2004/0226758 | A1 | * | 11/2004 | Jones ............... F28F 19/00 177/142 |
| 2012/0102955 | A1 | | 5/2012 | Yamamoto et al. |

FOREIGN PATENT DOCUMENTS

| | | |
|---|---|---|
| EP | 0 884 526 | 12/1998 |
| EP | 1 188 986 | 3/2002 |
| EP | 1 728 919 | 12/2006 |
| GB | 430556 | 6/1935 |
| JP | 08-82405 | 3/1996 |
| JP | H09229301 | 9/1997 |
| JP | 2003042406 | 2/2003 |
| WO | 2014/044911 | 3/2014 |
| WO | 2015/083253 | 6/2015 |

OTHER PUBLICATIONS

Written Opinion of the ISA for PCT/FI2017/050039, dated Jun. 9, 2017, 7 pages.
U.S. Appl. No. 15/759,620, filed Mar. 13, 2018.
Finnish Search Report cited in Application No. 20165056 dated Aug. 25, 2016, 2 pages.

* cited by examiner

ARRANGEMENT OF HEAT RECOVERY SURFACES OF A RECOVERY BOILER

This application is the U.S. national phase of International Application No. PCT/FI2017/050039 filed Jan. 25, 2017, which designates the U.S. and claims priority to Finnish Patent Application 20165056 filed Jan. 28, 2016, the entire contents of each of which are hereby incorporated by reference.

OBJECT OF THE INVENTION

The present invention relates to an arrangement for recovering heat of flue gases being generated in the combustion of waste liquor, such as black liquor, in a chemical recovery boiler of the chemical pulping industry.

BACKGROUND OF THE INVENTION

In the production of chemical pulp, lignin and other organic non-cellulosic material is separated from the raw material of chemical pulp by cooking using cooking chemicals. Cooking liquor used in chemical digestion, i.e. waste liquor, is recovered. The waste liquor, which is separated mechanically from the chemical pulp, has a high combustion value due to carbonaceous and other organic, combustible material contained therein and separated from the chemical pulp. The waste liquor also contains inorganic chemicals, which do not react in chemical digestion. Several different methods have been developed for recovering heat and chemicals from waste liquor.

Black liquor obtained in sulfate pulp production is combusted in a recovery boiler. As the organic and carbonaceous materials contained in black liquor burn, inorganic components in the waste liquor are converted into chemicals, which can be recycled and further utilized in the cooking process.

Hot flue gases are generated in black liquor combustion, which are led into contact with various heat exchangers of the recovery boiler. Flue gas conveys heat into water or vapor, or a mixture of water and vapor, flowing inside the heat exchangers, simultaneously cooling itself. Usually flue gases contain abundantly of ash. Main part of the ash is sodium sulfate, and the next largest part is usually sodium—carbonate. Ash contains other components, too. The ash entrained in flue gases is in the furnace mainly in vaporized form, and starts to convert into fine dust or smelt droplets mainly in the parts of the boiler downstream of the furnace. The salts contained in the ash melt, or they are sticky particles even at relatively low temperatures. Molten and sticky particles stick easily onto heat transfer surfaces and even corrode them. Deposits of sticky ash have caused a clogging risk of the flue gas ducts, and also corrosion and wearing of the heat surfaces in the boiler.

A chemical recovery boiler is conventionally formed of the following main parts, which are illustrated schematically in FIG. 1:

The furnace of a recovery boiler comprises a front wall and side walls. The width of the furnace refers to the horizontal length of the front wall and the depth refers to the length of the side wall of the furnace. FIG. 1 illustrates the structure of a chemical recovery boiler having a furnace defined by water tube walls, a front wall 11, side walls 9 and a rear wall 10, and also a bottom 15 formed of water tubes. Combustion air is fed into the furnace from multiple different levels 18. The air levels can be located also differently from what is presented in the Figure. Waste liquor, such as black liquor, is fed into the furnace from nozzles 12. During combustion, a smelt bed is formed onto the bottom of the furnace. The smelt is removed from the bottom of the furnace via a conduit 17, typically via smelt spouts.

A lower part 1 of the furnace, where combustion of waste liquor mainly takes place.

A middle part 2 of the furnace, where the final combustion of gaseous combustible substances mainly takes place.

An upper part 3 of the furnace

A superheater zone 4, wherein the saturated steam exiting the steam drum 7 is converted into (superheated) steam having a higher temperature. In the superheater zone or in front of it there is often a so-called screen tube surface or screen tubes, which usually acts as a water reboiler.

in a flue gas duct following the furnace are the heat transfer exchangers downstream of the superheaters: a boiler bank and economizers, wherein the heat of flue gas generated in the furnace is recovered. The boiler bank 5, i.e. water vaporizer, is located in the first flue gas channel of the flue gas duct, i.e. in a so-called second pass. In the boiler bank the water in saturated temperature is partly boiled into vapor.

Feed water preheaters, i.e. so-called economizers 6a, 6b, wherein the feed water flowing in the heat transfer elements is preheated by means of flue gases prior to leading the water into the drum 7 and into the steam-generating parts (boiler bank 5, walls of the furnace and possible screen tubes) and into superheating parts 4 of the boiler.

A drum (or steam drum) 7 having water in the lower part and saturated steam in the upper part. Some boilers have two drums: a steam drum (upper drum) and a water drum (lower drum), between which a heat exchanger, so-called boiler bank tubes for boiling the water are provided.

Other parts and devices in conjunction with the boiler, such as e.g. a combustion air system, a flue gas system, a liquor feeding system, a treatment system for smelt and liquor, feed water pumps etc. A so-called nose is marked with reference numeral 13.

The water/steam circulation of the boiler is arranged via natural circulation, whereby the water/steam mixture formed in the water tubes of the walls and bottom of the furnace rises upwards via collection tubes into the steam drum 7 that is located crosswise in relation to the boiler, i.e. parallel to the front wall 11. Hot water flows from the steam drum via downcomers 14 into a manifold of the bottom 15, where from the water is distributed into the bottom water tubes and further into the water tube walls.

The preheater i.e. economizer typically refers to a heat exchanger comprising heat transfer elements, inside which the boiler feed water to be heated flows. Free space for flue gas flow remains in the economizer between the heat exchanger elements. As the flue gas flows by the heat exchanger elements, heat is transferred into the feed water flowing inside the elements. The boiler bank is also formed of heat transfer elements, inside which the water to be boiled or a mixture of water and steam flows, into which the heat is transferred from the flue gas flowing past the elements.

The heat exchangers for heat recovery, i.e. boiler bank and economizers, are usually constructed so that in them the flue gas flows not from down upwards, but usually only from above downwards. In economizers, the flow direction of water is usually opposite to the flow direction of flue gases in order to provide a more economical heat recovery.

In some waste liquor recovery boilers the boiler bank is constructed so that the flue gases flow substantially horizontally. In single drum boilers having such a horizontal flow boiler bank, the heat transfer elements of the boiler bank are positioned so that the water to be boiled flows substantially from down upwards. The boiler bank here is referred to as a horizontal flow boiler bank because the flue gases flow substantially horizontally. Two drum boilers are typically provided with an upper drum and a lower drum, between which the boiler bank tubes are located so that the water to be boiled flows in the tubes substantially from down upwards, and the flue gases flow substantially horizontally. In these cases, a common term cross flow can be used for the flue gas and water streams, or a term cross flow boiler bank for the boiler bank.

In a conventional waste liquor recovery boiler illustrated schematically in FIG. 1, which has a so-called vertical flow boiler bank 5, the flue gases flow vertically from above downwards. A flow channel 8 for flue gases is arranged adjacent to the boiler bank, in which channel the flue gases that have flown through the boiler bank 5 flow from down upwards. The channel 8 is as conventional devoid of heat exchangers. Next to the channel 8 there is a first economizer (a so-called hotter economizer) 6a, wherein the flue gases flow from above downwards, transferring heat into the feed water that flows in the heat exchanger elements of the economizer. In a corresponding way, a second flue gas channel 9 is arranged next to the hotter economizer, in which channel the flue gases coming from the lower end of the economizer 6a flow upwards. Also this flue gas channel is, as conventional, a substantially empty channel without heat exchange elements for heat recovery or water preheaters. Next to the flue gas channel 9 is a second economizer, a so-called colder economizer 6b, in which the flue gases flow from above downwards, heating the feed water flowing in the heat exchange elements.

In addition to the boiler bank 5, two economizers 6a and 6b and the channels 8, 9 between them, the boiler can have several corresponding flue gas channels and economizers.

As is known, the flue gases in the boiler bank and in the economizers are arranged to flow from above downwards. The ash entrained in the flue gases fouls the heat transfer surfaces. As ash particles stick onto the heat transfer surfaces, the ash layer gradually gets thicker, which impairs heat transfer. If ash accumulates abundantly on the surfaces, the flow resistance of the flue gas can grow into a disturbing level. Heat transfer surfaces are cleaned with steam blowers, via which steam is from time to time blown onto the heat transfer surfaces, whereby the ash accumulated onto the surfaces is made to come loose and pass with the flue gases into ash collection hoppers located in the lower part of the heat transfer surface.

Not all recovery boilers are provided with a boiler bank. European patent application 1188986 presents a solution, in which the first flue gas duct part downstream of the recovery boiler, the so-called second pass, is provided with at least one superheater, especially a primary superheater. Then a problem can be excess increase of the temperatures of surfaces in this part of the flue gas duct. WO patent application 2014044911 presents that said part of the flue gas duct is arranged for being cooled with cooling medium coming from the screen tubes.

European patent 1728919 presents an arrangement, where the part of the flue gas duct downstream of the recovery boiler, the so-called second pass, is provided with both a boiler bank and an economizer one after the other in the incoming direction of the flue gas, but the superheater surfaces are located, corresponding to prior art, in the upper part of the furnace of the boiler. When the second pass is provided with a boiler bank and an economizer, it limits the positioning of other heat surfaces, such as a superheater surface, in the flue gas flow.

There are also solutions, in which the electricity production of a chemical pulp mill is suggested to be improved by means of a reheater located in the recovery boiler. The reheater and the superheater are in principle and in practice similar heat transfer surfaces. A difference is that in "actual" superheaters (which in this patent application is called a superheater) saturated steam exiting a boiler drum is superheated step by step to a hotter temperature (e.g. to a temperature of approximately 515° C.), until after the last step it is called live steam. The live steam is then led into a steam turbine for production of electrical energy. In a reheater, in its turn, steam obtained from a turbine is heated and after that returned back into the turbine. Bled steams are taken from the turbine at predetermined pressure levels and they are used e.g. for heating the feed water or combustion airs. When using a reheater, the steam remaining in the turbine is led at an optimized pressure back into the boiler, into a reheater, where the steam is heated and the heated steam is taken back into the turbine for improving the production of electricity. In known solutions, such as in U.S. Pat. Nos. 7,640,750 and 8,443,606, reheaters are located in a conventional superheater zone in the upper part of the furnace. However, this kind of arrangement decreases the space for superheaters or the height of the boiler and thus the whole boiler building has to be increased. U.S. Pat. No. 7,640,750 presents a two-stage reheater, the latter stage of which is located in a cavity in the recovery boiler. Fuel is combusted in the cavity for producing flue gases.

BRIEF DESCRIPTION OF THE INVENTION

An object of the present invention is to provide a more flexible solution than earlier for modifying the size and positioning of various heat recovery surfaces of a recovery boiler in accordance with the needs of the process when the boiler has a reheater in addition to superheaters.

The invention relates to an arrangement in a recovery boiler having a furnace for combusting waste liquor and a flue gas duct comprising vertical flue gas channels, at least some of which are provided with heat recovery units for recovering heat from flue gases. The flue gases flow in the sequential flue gas channels from above downwards and from down upwards. The heat recovery units have a width of substantially that of the flue gas duct. Characteristic of the arrangement is that a reheater is located in a first flue gas channel after the furnace, in the so-called second pass, and that in addition to the reheater, one of the following heat recovery units is located therein: an economizer or a boiler bank. The reheater and the second heat recovery unit are located parallel so that in the flue gas channel the flue gas flows in a vertical direction from above downwards and heats the reheater and the second heat recovery unit simultaneously. With respect to the horizontal flow direction of the flue gas the reheater and the second heat recovery unit are located one after the other. The reheater and the second heat recovery unit, i.e. an economizer or a boiler bank typically have a width equal to that of the flue gas duct (i.e. of the length of the front and rear wall of the furnace). Each heat recovery unit, i.e. the reheater, the economizer and the boiler bank, is formed of a number of heat recovery elements.

A reheater, a boiler bank and an economizer refer to heat recovery units, which are formed of heat exchange elements, typically tubes, inside which the water, steam or their mixture to be heated flows. Free space for flue gas flow remains between the heat transfer elements. As the flue gas flows by the heat exchange elements, heat is transferred into the water and/or steam flowing inside the elements. The flue gas flowing downwards in the flue gas channel heats the reheater and the second heat transfer unit simultaneously, whereby the flue gas at a certain temperature heats simultaneously both the reheater and the second heat transfer unit. The reheater is coupled to a steam turbine, the bled steam of which the reheater heats. The steam is returned into the steam turbine at a higher temperature, whereby electricity production is increased, since the steam can be flashed in the turbine to a lower pressure. The reheater of the boiler can also be two-staged. Then, the reheater of the first stage is located in the first flue gas channel (in the so-called second pass) together with an economizer or a boiler bank. The reheater of the second stage is located in the upper part of the boiler upstream of the second pass in the superheater zone. From the reheater of the first stage the steam flows into the reheater of the second stage and further into the turbine. When the reheater is part of the recovery boiler, the electricity production and its efficiency can be maximized.

The invention also relates to an arrangement in a recovery boiler having a furnace for combusting waste liquor and a flue gas duct comprising vertical flue gas channels, at least some of which are provided with heat recovery units for recovering heat from flue gases. The flue gases flow in the sequential flue gas channels from above downwards and from down upwards. The heat recovery units are formed of heat recovery elements, whereby downstream of the furnace the first flue gas channel is provided with a reheater. In addition to the reheater, located in the first flue gas channel is one of the following heat recovery units: an economizer or a boiler bank, and heat recovery elements of the reheater and the second heat recovery unit are located side by side in a direction that is transverse to the horizontal incoming direction of the flue gas, and so that in the flue gas channel the flue gas flows in a vertical direction from above downwards and heats simultaneously the reheater and the second heat recovery unit, which are located in parallel with respect to the flue gas. In other words, reheater elements and elements of the second heat recovery unit are located staggered in a row that is transverse with respect to the horizontal incoming direction of the flue gas and also parallel to the front wall/rear wall of the boiler. For example, every second heat recovery element can be a reheater element and every second an economizer element, or a boiler bank element. However, the number of reheater elements and elements of the second heat recovery unit need not always be equal, but their ratio is determined according to need.

Flue gas has in the second pass a certain maximum velocity, which in practice dictates the size of the heat surface therein, such as the number of tubes forming the heat surface, and the depth of the flue gas channel. When various heat surfaces are located in the second pass in parallel with respect to the vertical flue gas flow, their size, such as the number of tubes, can be chosen more freely, since the flue gases flow at all of them. This provides an advantage for investment costs and in the production of electricity in recovery boilers, where the best possible performance is sought by altering the mutual sizes of various heat surfaces with respect to each other, and the aim is to keep the boiler building as small as possible.

Further, the soot blowers of the second pass soot all parallel heat surfaces therein, whereby savings are obtained in the total number of the soot blowers and the consumption of sooting steam compared to a boiler wherein these are separate sequential surfaces located in different flue gas channels.

A further advantage is that all required superheater surfaces can be arranged in the side of the furnace of the boiler without needing to increase the size of the boiler.

According to an embodiment of the invention, a reheater and an economizer are located in the first flue gas channel, and typically they are positioned in the incoming direction of the flue gas one after the other so that the reheater is the first of them. Then the advantage is that more economizer surface can be located inside the boiler without enlarging the building, whereby the temperature of feed water can be raised higher with less expenses. In that way, the area of the second pass can be effectively utilized in boilers with no need for a boiler bank.

According to an embodiment of the invention, a reheater and a boiler bank are located in the first flue gas channel. Typically they are positioned in the incoming direction of the flue gas, i.e. in the horizontal flow direction, one after the other so that the reheater is the first of them. The flue gas has in the boiler bank a certain maximum velocity, which in practice dictates the number of heat transfer tubes of the boiler bank and the depth of the flue gas channel. When the boiler bank is located next to the reheater, the number of tubes in the boiler bank can be chosen more freely, since the flue gases flow also at the reheater. This provides an advantage in investment costs and electricity production in recovery boilers having a smaller need for boiler bank. In present recovery boilers the dry solids of the black liquor being combusted is high (e.g. 85%) and also the pressure of live steam, e.g. 110 bar, and its temperature 510-520° C. are high, whereby the ratio of the required boiler bank surface to the superheating surfaces is smaller.

The cooling of the walls of second pass can advantageously be arranged so that its wall tubes are coupled with a dedicated tube circulation to a boiler drum. This arrangement is most advantageous when the second pass is devoid of boiler bank. Again, if a boiler bank is provided in the second pass, its walls are most advantageously cooled by coupling the wall tubes in parallel with the boiler bank, so that they receive the cooling water via downcomers of the boiler bank. In each of the mentioned cases a steam/water mixture flows in the walls of the second pass. It is also possible that the cooling of the walls is performed by means of steam, whereby the wall tubes are coupled to the first superheater. In steam cooling the controlling of heat expansion of the tubes can be challenging.

According to an embodiment of the invention, reheater elements and economizer elements are located staggered in the first flue gas channel. Thus, they are positioned side by side in a row that is crosswise with respect to the horizontal incoming direction of the flue gas. The heat recovery elements can be positioned e.g. so that every second element is a reheater element and every second is an economizer element. The positioning does not need to be symmetrical. It is also possible that the number of reheater elements is higher than the number of economizer elements or vice versa. The number and size of the elements are dependent on the required heat surface according to the structure of each boiler and the process conditions.

According to an embodiment of the invention, reheater elements and boiler bank elements are located in the first flue gas channel. Thus, they are positioned side by side in a row that is crosswise with respect to the horizontal incoming direction of the flue gas. The heat surface elements can be positioned e.g. so that every second element is a reheater element and every second is a boiler bank element. The positioning does not need to be symmetrical. It is also possible that the number of reheater elements is higher than the number of boiler bank elements or vice versa. The number and size of the elements is dependent on the required heat surface according to the structure of each boiler and the process conditions.

A boiler bank can become unnecessary at high pressure levels of live steam and at high dry solids levels of firing liquor. Then, also the expensive drum can be made smaller, since the requirement for phase separation capacity is smaller.

A chemical recovery boiler comprises, as known per se, devices coupled to the bottom part of the furnace for chemical smelt removal. The devices typically comprise at least smelt spouts.

BRIEF DESCRIPTION OF THE DRAWINGS

FIGS. 2-5 use the same reference numerals as FIG. 1 where applicable.

Figure 1:
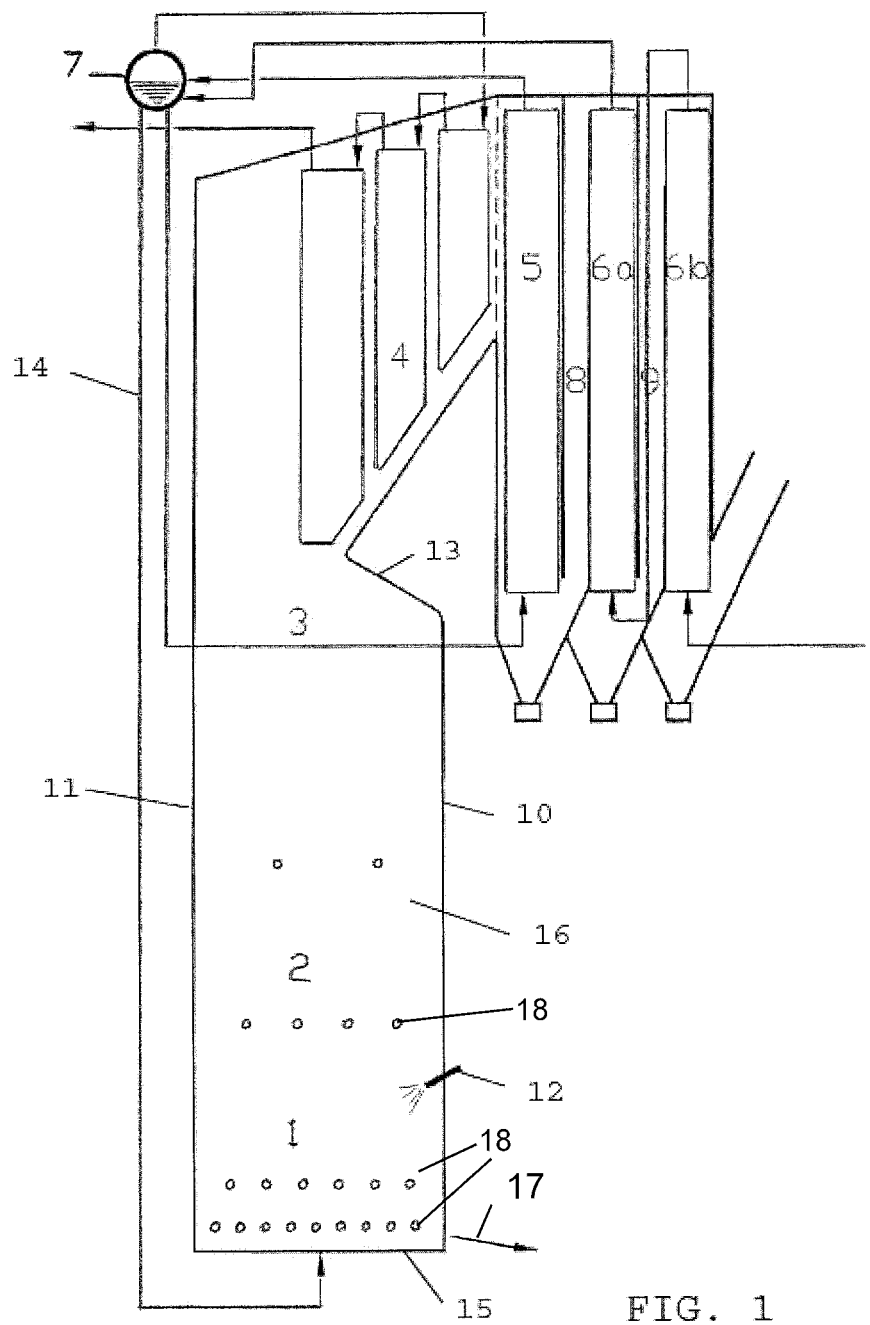
FIG. 1 illustrates schematically a conventional recovery boiler.
Figure 2:
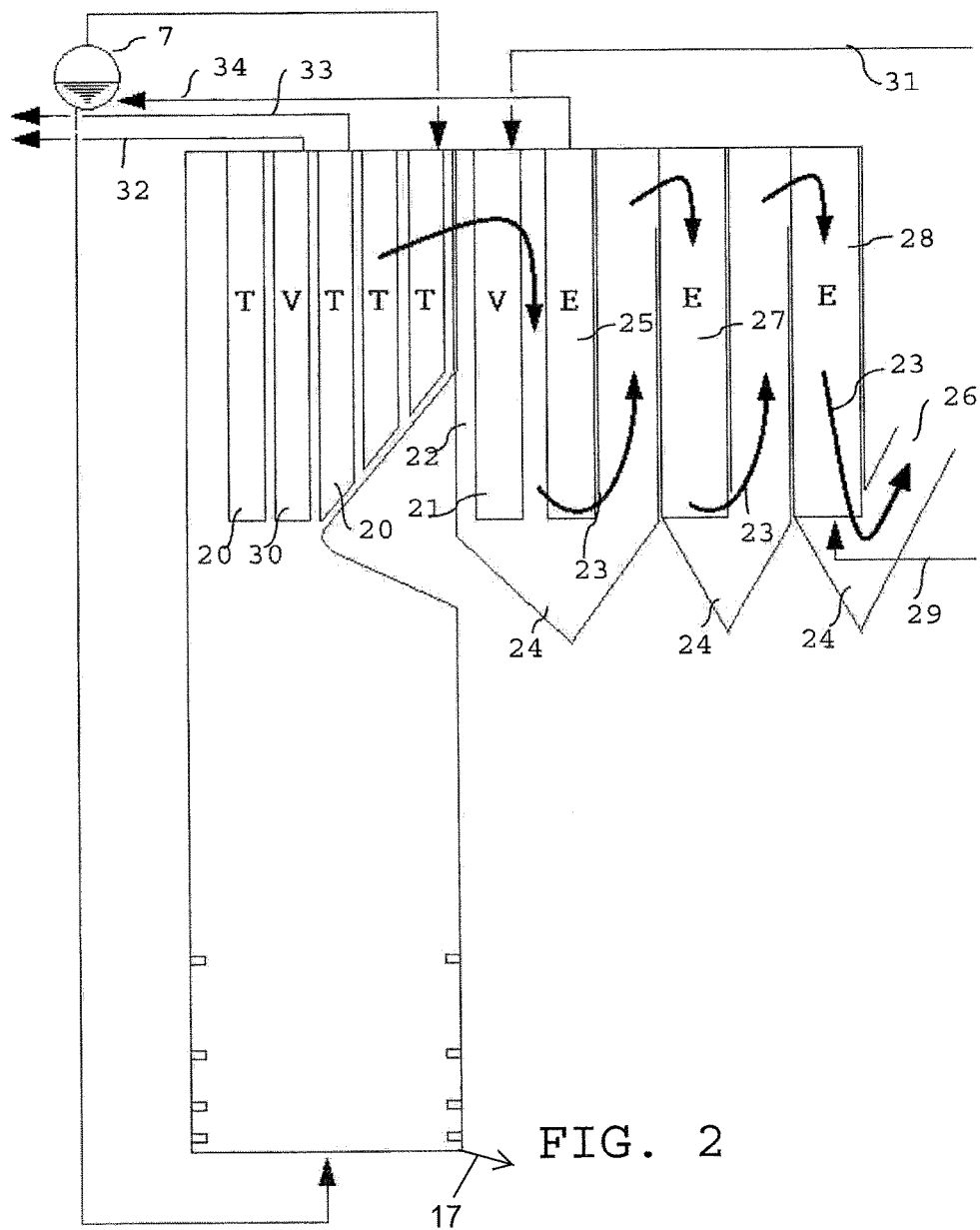
FIG. 2 illustrates a preferred embodiment of the invention, where the so-called second pass of the flue gas duct of a recovery boiler is provided with a second heat recovery unit in addition to a reheater.

In the embodiment presented in FIG. 2 the superheaters (T) 20 of the recovery boiler are located in the upper part of the furnace, from where the superheated steam is led via line 33 to be used at a suitable location, such as in a turbine. Further, a reheater 30 is arranged in the superheater zone. A second reheater 21 is located in the so-called second pass 22. The flue gas flows past the superheaters 20 mainly horizontally, while in the flue gas duct the flue gas flows through vertical flue gas channels in turn from above downwards and from down upwards, as shown by arrows 23. Ash hoppers 24 are provided in the lower part of the flue gas duct.

Steam enters the reheater 21 located in the second pass from a steam turbine (not shown), bled steam of which the reheater heats. The bled steam is led into the reheater 21 via line 31. From the reheater 21 the steam is led into a reheater 30 located in superheater zone, after which the heated steam is returned into the steam turbine via line 32.

In addition to the reheater, the flue gas channel, the so-called second pass 22, is provided with an economizer (E) 25. In the flue gas channel the flue gas flows vertically from above downwards and heats the reheater 21 and the economizer 25 simultaneously. With respect to the horizontal flow direction of the flue gas the reheater 21 and the economizer 25 are located one after the other. The reheater 21 and the economizer 25 extend typically to the whole width of the flue gas duct. The flue gas flows further through sequential flue gas channels and exits via a discharge opening 26. In addition to the economizer 25 the flue gas duct is provided with economizers 27 and 28. The boiler water is fed into the economizers via line 29, and after it has flown counter-currently with respect to the flue gas it is led from the economizer 25 of the so-called second pass into a drum 7 of the boiler via line 34.

When the reheater and the economizer are positioned in the second in parallel with respect to downwards flowing flue gas, the number of their tubes can be chosen more freely, since the flue gases flow past all the tubes. This gives an advantage when there is a need to change the mutual sizes of different heat recovery surfaces with respect to each other and to keep the boiler building as small as possible.

Figure 3:
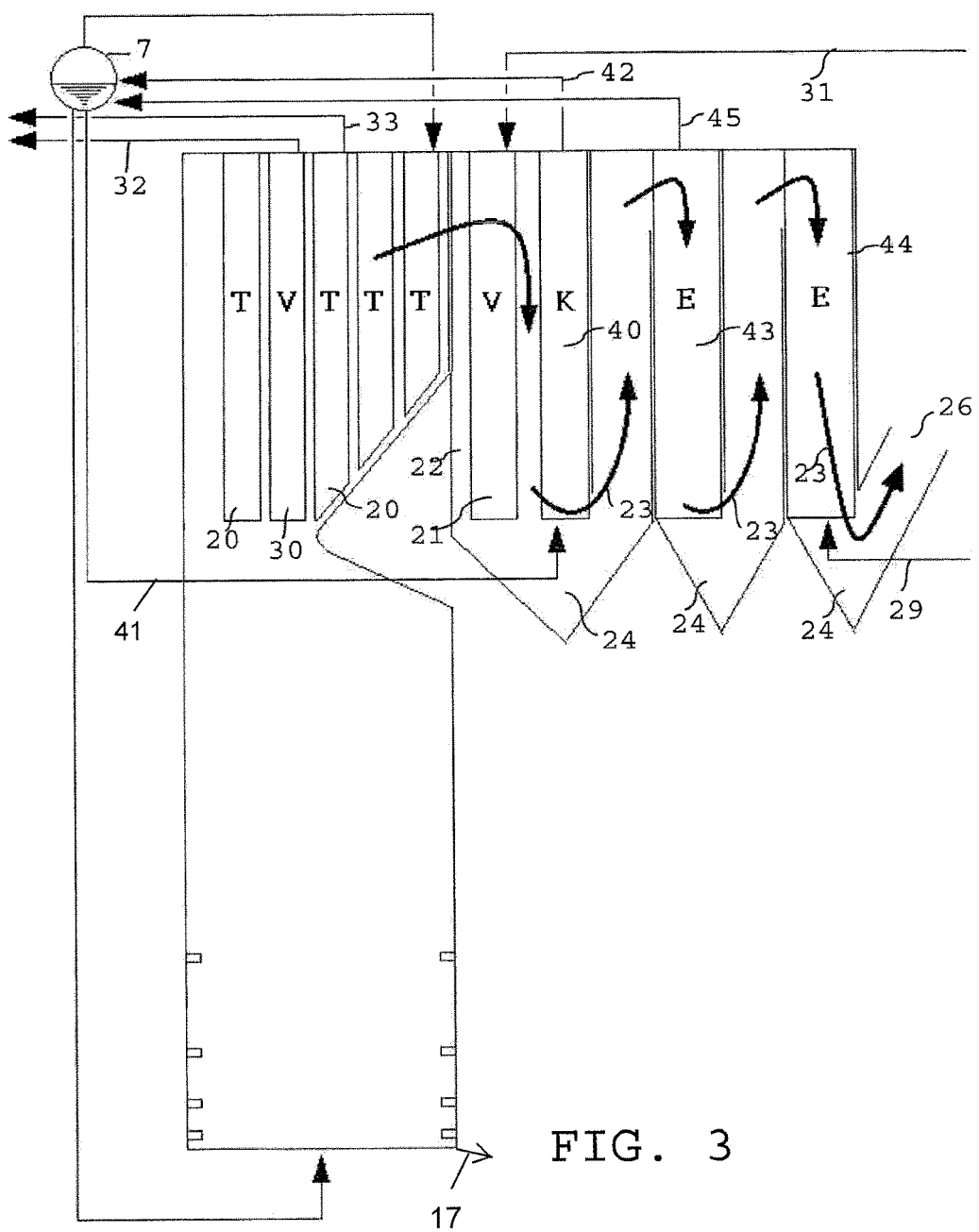
FIG. 3 illustrates a second preferred embodiment of the invention, where the so-called second pass of the flue gas duct of a recovery boiler is provided with a second heat recovery unit in addition to a reheater.

The embodiment shown in FIG. 3 relates to a recovery boiler where a boiler bank is needed. The superheaters (T) 20 of the recovery boiler are located in the upper part of the furnace, from where superheated steam is led via line 33 to be used at a suitable location, such as in a turbine. Further, a reheater 30 is arranged in the superheater zone. A second reheater 21 is located in the so-called second pass 22. The flue gas flows past the superheaters 20 mainly horizontally, while in the flue gas duct the flue gas flows through vertical flue gas channels in turn from above downwards and from down upwards, as shown by arrows 23. Ash hoppers 24 are provided in the lower part of the flue gas duct.

Steam enters the reheater 21 located in the second pass from a steam turbine (not shown), bled steam of which the reheater heats. The bled steam is led into the reheater 21 via line 31. From the reheater 21 the steam is led into the reheater 30 located in superheater zone, after which the heated steam is returned into the steam turbine via line 32.

In addition to the reheater, the flue gas channel, the so-called second pass 22, is provided with a boiler bank 40. In the flue gas channel 22 the flue gas flows vertically from above downwards and heats the reheater 21 and the boiler bank 40 simultaneously. With respect to the horizontal flow direction of the flue gas the reheater 21 and the boiler bank 40 are located one after the other. The reheater 21 and the boiler bank 40 extend typically to the whole width of the flue gas duct. In the boiler bank 40 the water at a saturated temperature coming from the drum 7 of the boiler via line 41 is boiled partly into steam 42, which is led into the drum 7.

The flue gas flows after the second pass 22 further through the sequential flue gas channels and exits via a discharge opening 26. The flue gas duct is additionally provided with economizers 43 and 44. The boiler water is fed into the economizers via line 29, and after it has flown counter-currently with respect to the flue gas it is led from the economizer 43 downstream of the so-called second pass via line 45 into the drum 7 of the boiler.

Positioning the reheater and the boiler bank in the second pass in parallel with respect to the downwards flowing flue gas provides advantages. The flue gas has in the boiler bank a certain maximum velocity, which in practice dictates the number of tubes of the boiler bank and the depth of the flue gas channel. When the boiler bank is located next to the reheater, the number of tubes in the boiler bank can be chosen more freely, since the flue gases flow also at the reheater. This provides an advantage in investment costs and electricity production in recovery boilers having a smaller need for boiler bank. The need for a boiler bank decreases at high pressure levels of live steam and at high dry solids levels of combustion liquor. The heat efficiency needed for boiling decreases as the pressure of the steam increases, the flue gas amount decreases with dryer combustion liquor. On the other hand, the feed water needs to be heated to a higher temperature, since the higher pressure simultaneously increases the saturated temperature, whereby the size of the economizer needs to the increased.

Figure 4:
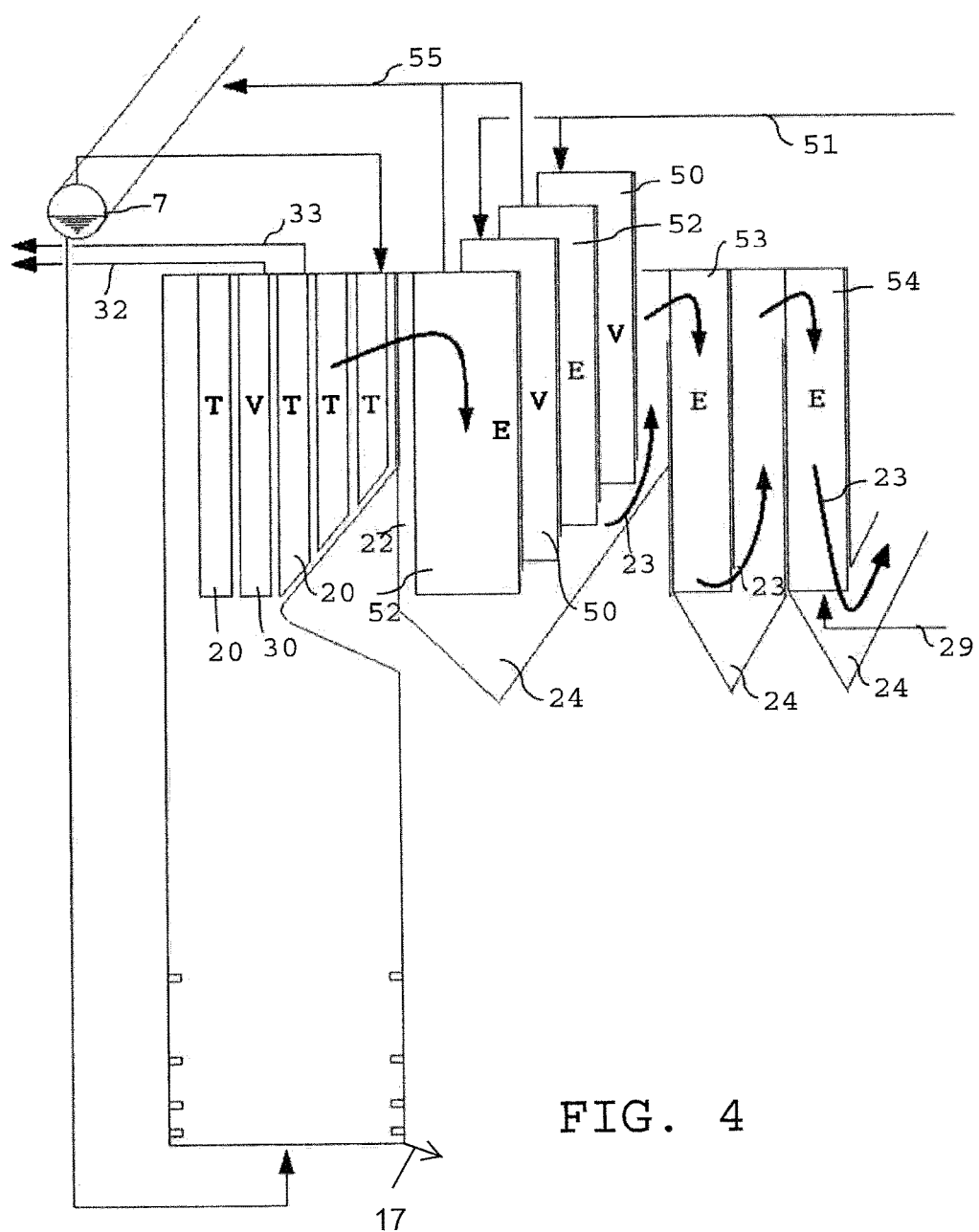
FIG. 4 illustrates a third preferred embodiment of the invention, where the so-called second pass of the flue gas duct of a recovery boiler is provided with a second heat recovery unit in addition to a reheater.

In the embodiment presented in FIG. 4 the superheaters (T) 20 of the recovery boiler are located in the upper part of the furnace, from where the superheated steam is led via line 33 to be used at a suitable location, such as in a turbine. Further, a reheater (V) 30 is arranged in the superheater zone. A second reheater 50 is located in the so-called second pass 22. The flue gas flows past the superheaters 20 mainly horizontally, while in the flue gas duct the flue gas flows through vertical flue gas channels in turn from above downwards and from down upwards, as shown by arrows 23. Ash hoppers 24 are provided in the lower part of the flue gas duct.

Steam enters the reheater 50 located in the second pass from a steam turbine (not shown), bled steam of which the reheater heats. The bled steam is led into the reheater 50 via line 51. From the reheater 50 the steam is led into the reheater 30 located in superheater zone, after which the heated steam is returned into a steam turbine via line 32.

Figure 5:
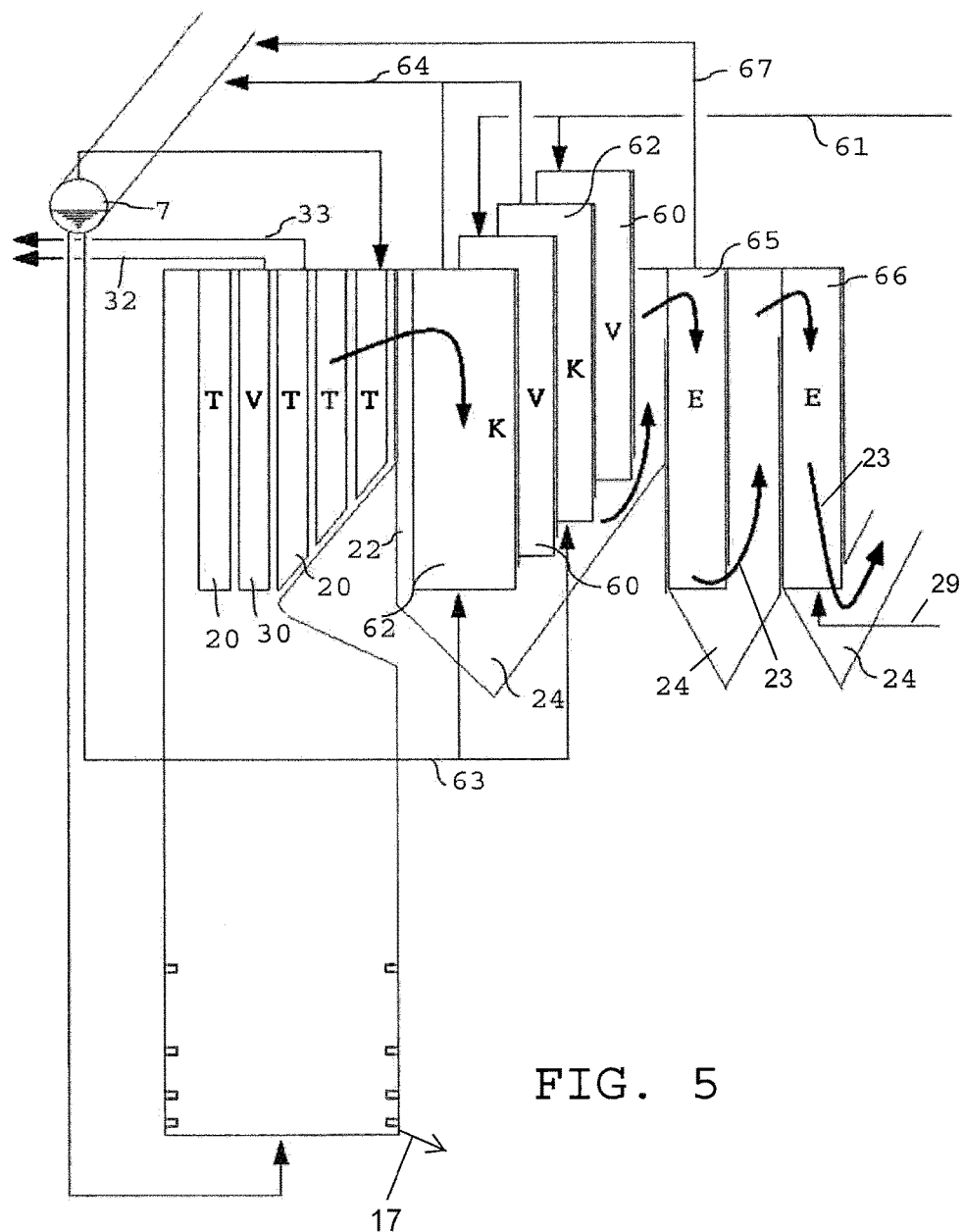
FIG. 5 illustrates a fourth preferred embodiment of the invention, where the so-called second pass of the flue gas duct of a recovery boiler is provided with a second heat recovery unit in addition to a reheater.

In addition to the reheater, the so-called second pass 22 is provided with an economizer 52 so that the first flue gas channel is provided with reheater elements 50 and economizer elements 52 staggered. Thus, they are positioned side by side in a row that is crosswise with respect to the horizontal incoming direction of the flue gas. It can also be said that the elements are positioned in a row in the direction of the front wall/rear wall of the boiler. The reheater elements and economizer elements are located in the second pass in parallel with respect to the downwards flowing flue gas. In FIG. 5 the heat recovery elements 50 and 52 are positioned so that every second element is a reheater element 50 and every second is an economizer element 52. The positioning does not need to be symmetrical. It is also possible that the number of reheater elements is higher than the number of economizer elements or vice versa. The number and size of the elements is dependent on the required heat surface according to the structure of each boiler and the process conditions.

In the flue gas channel 22 the flue gas flows vertically from above downwards and heats the reheater elements 50 and the economizer elements 52 simultaneously. The flue gas flows further through the sequential flue gas channels and exits via a discharge opening 26. In addition to the economizer 52 the flue gas duct is provided with economizers 53 and 54. The boiler water is fed into the economizers via line 29, and after it has flown counter-currently with respect to the flue gas it is led from the economizer elements 52 of the so-called second pass via line 55 into the drum 7 of the boiler.

When the reheater and the economizer are positioned in the second pass in parallel with respect to the downwards flowing flue gas, the number of their tubes can be chosen more freely, since the flue gases flow past all the tubes. This gives an advantage when there is a need to change the mutual sizes of different heat recovery surfaces with respect to each other and to keep the boiler building as small as possible.

The embodiment shown in FIG. 5 relates to a recovery boiler where a boiler bank is needed. The superheaters (T) 20 of the recovery boiler are located in the upper part of the furnace, from where the superheated steam is led via line 33 to be used at a suitable location, such as in a turbine. Further, a reheater 30 is arranged in the superheater zone. A second reheater 60 is located in the so-called second pass 22. The flue gas flows past the superheaters 20 mainly horizontally, while in the flue gas duct the flue gas flows through vertical flue gas channels in turn from above downwards and from down upwards, as shown by arrows 23. Ash hoppers 24 are provided in the lower part of the flue gas duct.

Steam enters the reheater 60 located in the second pass from a steam turbine (not shown), bled steam of which the reheater heats. The bled steam is led into the reheater 60 via line 61. From the reheater 60 the steam is led into a reheater 30 located in superheater zone, after which the heated steam is returned into a steam turbine via line 32.

The superheaters (T) 20 are located in the upper part of the furnace and the reheater 60 in the so-called second pass 22. The flue gas flows past the superheaters 20 mainly horizontally, while in the flue gas duct the flue gas flows through vertical channels in turn from above downwards and from down upwards, as shown by arrows 23. Ash hoppers 24 are provided in the lower part of the flue gas duct.

In addition to the reheater, the flue gas channel, the so-called second pass 22, is provided with a boiler bank 62 so that the first flue gas channel is provided with reheater elements 60 and boiler bank elements 62 staggered. Thus, the reheater elements and the boiler bank elements are positioned side by side in a row that is crosswise with respect to the horizontal incoming direction of the flue gas. It can also be said that the elements are positioned in a row in the direction of the front wall/rear wall of the boiler. In FIG. 5 the heat recovery elements 60 and 62 are positioned so that every second element is a reheater element 60 and every second is a boiler bank element 62. The positioning does not need to be symmetrical. It is also possible that the number of reheater elements is higher than the number of boiler bank elements or vice versa. The number and size of the elements is dependent on the required heat surface according to the structure of each boiler and the process conditions.

In the flue gas channel 22 the flue gas flows vertically from above downwards and heats the reheater elements 60 and the boiler bank elements 62 simultaneously. In the boiler bank elements 62 the water at a saturated temperature coming from the drum 7 of the boiler via line 63 is boiled partly into steam that is led into the drum 7 via line 64.

The flue gas flows after the second pass 22 further through the sequential flue gas channels and exits via a discharge opening 26. The flue gas duct is additionally provided with economizers 65 and 66. The boiler water is fed into the economizers via line 29, and after it has flown counter-currently with respect to the flue gas it is led from the economizer 65 located after the so-called second pass into the drum 7 of the boiler via line 67.

Positioning the reheater elements and the boiler bank elements in the second pass parallel with respect to the downwards flowing flue gas provides advantages. The flue gas has in the boiler bank a certain maximum velocity, which in practice dictates the number of tubes of the boiler bank and the depth of the flue gas channel. When the boiler bank is located next to the reheater, the number of tubes in the boiler bank can be chosen more freely, since the flue gases flow also at the reheater. This provides an advantage in investment costs and electricity production in recovery boilers having a smaller need for boiler bank. The need for a boiler bank decreases at high pressure levels of live steam and at high dry solids levels of combustion liquor. The heat efficiency needed for boiling decreases as the pressure of the steam increases and the flue gas amount decreases with dryer combustion liquor. On the other hand, the feed water needs to be heated to a higher temperature, since the higher pressure simultaneously increases the saturated temperature, whereby the size of the economizer needs to the increased.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. A chemical recovery boiler comprising:
   a furnace;
   a smelt outlet at a bottom region of the furnace and configured to discharge chemical smelt produced in the furnace due to combustion of waste liquor, and
   a flue gas duct coupled to an upper region of the furnace and comprising vertical flue gas channels, at least some of which are provided with heat recovery units configured to recover heat from flue gases generated in the furnace, said heat recovery units having a width of substantially that of the flue gas duct,
   wherein a first flue gas channel of the vertical flue gas channels is downstream of the furnace and upstream of all other flue gas channels of the vertical flue gas channels, and the first flue gas channel is provided with a reheater and a heat recovery unit, wherein the heat recovery unit is an economizer or a boiler bank, and
   wherein the reheater and the second heat recovery unit are arranged, with respect to a horizontal incoming direction of the flue gas, one after the other so that in the first flue gas channel the flue gases flow in a vertical downwards direction through the reheater and the second heat recovery unit simultaneously and thereby heats the reheater and the second heat recovery unit simultaneously.

2. The chemical recovery boiler according to claim 1, wherein the heat recovery unit is the economizer, and the reheater and the economizer are positioned in the first flue gas channel, with respect to the horizontal incoming direction of the flue gases, one after the other so that the reheater is in front of the economizer with respect to the flow of the flue gases.

3. The chemical recovery boiler according to claim 1, wherein the heat recovery unit is the boiler bank, and the reheater and the boiler bank are positioned in the first flue gas channel, with respect to the horizontal incoming direction of the flue gases, one after the other so that the reheater is in front of the boiler bank with respect to the flow of the flue gases.

4. The chemical recovery boiler according to claim 1, the first flue gas channel includes wall tubes and the wall tubes in fluid communication with a drum of the boiler.

5. The chemical recovery boiler according to claim 1, wherein the first flue gas channel includes wall tubes in fluid communication with a superheater in the furnace.

6. The chemical recovery boiler of claim 1, wherein the first flue gas channel has an upper inlet and a lower outlet and is configured for the flue gas to flow in a downward direction through the first flue gas channel, and
   wherein the other vertical flue gas channels include updraft flue gas channels each having a lower inlet and an upper outlet, and downdraft flue gas channels each having an upper inlet and a lower outlet,
   wherein a first of the updraft flue gas channels is between the first flue gas channel and a first of the downdraft flue gas channels and the other updraft flue gas channel(s) are between successive ones of the downdraft flue gas channels, and
   wherein the downdraft flue gas channels each have at least one of an economizer and a boiler bank.

7. The chemical boiler of claim 6, wherein the updraft flue gas channels are devoid of a reheater, an economizer and a boiler bank.

8. The chemical boiler of claim 6 wherein the updraft flue gas channels, the downdraft flue gas channels and the first flue gas channel are horizontally aligned such that each are at common elevations.

9. A chemical recovery boiler comprising:
   a furnace configured to combust waste liquor;
   a smelt outlet in a lower region of the furnace and configured to discharge smelt produced in the furnace from the combustion of the waste liquor, and
   a flue gas duct coupled to an upper region of the furnace and including vertical flue gas channels, each of which includes a heat recovery unit configured to recovery heat from flue gases passing through the flue gas duct,
   wherein the heat recovery units each include heat recovery elements,
   wherein the flue gas channels include a first flue gas channel which is immediately downstream of the furnace and is provided with a reheater;
   wherein the heat recovery unit of the first flue gas channel includes at least one of an economizer and a boiler bank,
   wherein, in the first flue gas channel, the heat recovery unit and the reheater are positioned side by side along a direction crosswise with respect to a horizontal incoming direction of the flue gases from the furnace so that in the first flue gas channel the flue gases flow downward and simultaneously across the heat recover unit and the reheater.

10. The chemical recovery boiler of claim 9, wherein the first flue gas channel has an upper inlet and a lower outlet and is configured for the flue gas to flow in a downward direction through the first flue gas channel, and
    wherein the other vertical flue gas channels include updraft flue gas channels each having a lower inlet and an upper outlet, and downdraft flue gas channels each having an upper inlet and a lower outlet,
    wherein a first of the updraft flue gas channels is between the first flue gas channel and a first of the downdraft flue gas channels and the other updraft flue gas channel(s) are between successive ones of the downdraft flue gas channels, and
    wherein the downdraft flue gas channels each have at least one of an economizer and a boiler bank.

11. The chemical boiler of claim 10, wherein the updraft flue gas channels are devoid of a reheater, an economizer and a boiler bank.

12. The chemical boiler of claim 10, wherein the updraft flue gas channels, the downdraft flue gas channels and the first flue gas channel are horizontally aligned such that each are at common elevations.

13. The chemical recovery boiler according to claim 9, wherein the heat recovery unit in the first flue gas channel includes the economizer.

14. The chemical recovery boiler according to claim 9, wherein the heat recovery unit in the first flue gas channel includes the boiler bank.

15. The chemical recovery boiler according to claim 9, wherein the first flue gas channel includes wall tubes in fluid communication with a drum of the boiler.

16. The chemical recovery boiler according to claim 15, wherein the first flue gas channel is in fluid communication with a superheater in the furnace.

17. A recovery boiler including:
a furnace configured to combust waste liquor and including an inlet to receive the waste liquor and an outlet for chemical smelt produced by the combustion, wherein the furnace includes walls extending vertically to confine and direct upwards flue gases generated by combustion;
superheaters arranged in an upper region of the furnace;
vertical flue gas channels adjacent and horizontally offset from the furnace, wherein the vertical flue gas channels include a first channel attached to the furnace and having a flue gas inlet in an upper region of the first channel and a flue gas outlet at a bottom region of the first channel, wherein the inlet receives flue gases flowing downstream from the superheaters;
wherein the first channel includes a reheater and a heat recovery unit and the heat recovery unit is at least one of an economizer and a boiler bank,
wherein the reheater and heat recovery unit in the first channel are arranged to simultaneously receive flue gas flowing down through the first channel,
wherein the other vertical flue gas channels include updraft flue gas channels each having a lower inlet and an upper outlet, and downdraft flue gas channels each having an upper inlet and a lower outlet,
wherein a first of the updraft flue gas channels is between the first channel and a first of the downdraft flue gas channels, and the other updraft flue gas channel(s) are between successive ones of the downdraft flue gas channels, and
wherein the downdraft flue gas channels each have at least one of an economizer and a boiler bank.

18. The recovery boiler of claim 17, wherein the flue gas duct further comprises a channel horizontally offset from the first channel, and is configured to receive flue gas from the flue gas outlet of the first channel and direct the flue gas upwards to an upper portion of another channel of the gas duct which is downstream of the first channel.

19. The recovery boiler of claim 17, wherein the reheater of the first channel is between the heat recovery unit and the super-heaters along a horizontal direction.

20. The recovery boiler of claim 17, further comprising an ash hopper attached to and directly below the first channel.

21. The recovery boiler of claim 17, wherein the first channel is attached to a rear wall of the walls of the furnace, and the reheater and heat recovery unit are arranged side-by-side such that a vertical plane parallel to the side wall of the furnace extends through the reheater and heat recovery unit.

22. The recovery boiler of claim 21, wherein the reheater and the heat recovery unit each have a length in a direction perpendicular to the vertical plane which is greater than a width in the vertical plane.

23. The recovery boiler of claim 21, wherein the reheater includes a plurality of reheaters and the heat recovery unit includes a plurality of heat recovery units, and at least one of the reheaters is between and adjacent to two of the heat recovery units.

24. The recovery boiler of claim 21, wherein the first channel includes wall tubes in fluid communication with at least one of a drum and the superheaters, wherein steam and/or water flows through the wall tubes and the at least one of the drum and the superheaters.

25. The recovery boiler of claim 17, wherein the updraft flue gas channels are devoid of a reheater, an economizer and a boiler bank.

26. The chemical boiler of claim 17, wherein the updraft flue gas channels, the downdraft flue gas channels and the first channel are horizontally aligned such that each are at common elevations.

* * * * *